(12) United States Patent
Marchev

(10) Patent No.: US 7,523,404 B2
(45) Date of Patent: Apr. 21, 2009

(54) SYSTEM AND METHOD FOR GENERATING COMPLEX CHARACTER-BASED COMPUTING INTERFACES

(75) Inventor: Nikola I. Marchev, Sofia (BG)

(73) Assignee: SAP Aktiengesellschaft, Walldorf (DE)

( * ) Notice: Subject to any disclaimer, the term of this patent is extended or adjusted under 35 U.S.C. 154(b) by 531 days.

(21) Appl. No.: 11/026,922

(22) Filed: Dec. 30, 2004

(65) Prior Publication Data

US 2006/0150112 A1 Jul. 6, 2006

(51) Int. Cl.
*G06F 3/00* (2006.01)
(52) U.S. Cl. .................. 715/762; 715/764; 715/810
(58) Field of Classification Search ............ 715/762, 715/764, 810, 841, 845; 345/352, 353; 717/109, 717/112, 113
See application file for complete search history.

(56) References Cited

U.S. PATENT DOCUMENTS

| | | | | |
|---|---|---|---|---|
| 5,226,118 A | * | 7/1993 | Baker et al. | 715/833 |
| 6,054,982 A | * | 4/2000 | Kikuchi et al. | 715/719 |
| 6,667,749 B2 | * | 12/2003 | Sato | 715/762 |
| 6,708,074 B1 | * | 3/2004 | Chi et al. | 700/121 |
| 7,254,784 B2 | * | 8/2007 | Chang | 715/810 |
| 2002/0196293 A1 | * | 12/2002 | Suppan et al. | 345/853 |

OTHER PUBLICATIONS

"Method for Providing Automatic ASCII Source FILE Creation, (original Publication date: Jan. 1, 1986)" by IBM TDB Gentry, ML (TDB Jan. 1986, p. 3278-3279).*

* cited by examiner

*Primary Examiner*—Kieu D Vu
(74) *Attorney, Agent, or Firm*—Blakely, Sokoloff, Taylor & Zafman, LLP

(57) ABSTRACT

A method for dynamically generating a console menu is described that involves displaying a console menu to a user that provides one or more menu options. Each of the one or more menu options is coupled to one or more respective console listeners such that there is at least one listener per menu option amongst the menu options. The method further includes waiting for the user to choose a selection from the menu options. Once a selection of a particular menu option is made, a least one of its associated one or more console listeners is notified. A new console menu is dynamically generated for the user based on the selection chosen by said user. The new console menu provides a new set of one or more options which may be selected by said user.

20 Claims, 6 Drawing Sheets

SYSTEM AND METHOD FOR GENERATING COMPLEX CHARACTER-BASED COMPUTING INTERFACES

BACKGROUND

1. Field of the Invention

This invention relates generally to the field of data processing systems. More particularly, the invention relates to an improved system and method for generating complex character-based computing interfaces.

2. Description of the Related Art

In order for a data processing device such as a personal computer or personal information manager ("PIM") to display a particular alphanumeric character or group of characters, the alphanumeric character(s) must be installed on the data processing device. For example, in order for a data processing device to display non-English characters, such as the "é" character ("e" with an "accent egu"), a character set, which includes those characters, must first be installed on the data processing device.

BACKGROUND

Most software applications include a graphical user interface (hereinafter "GUI"). A GUI is a visual environment that contains movable and re-sizeable windows, drop-down menus, graphics, buttons, slide bars and other items that can be manipulated by using a pointing device (e.g., mouse, track ball, tablet or stylus). One way in which GUIs are used is configuration settings for software applications. Many software applications and development tools offer configuration menus in which a user may view configuration settings as well as make changes. In such an environment, radio boxes and/or check boxes are often used to display and change settings. Such settings are often represented as a boolean value (e.g., a setting is either "on" (TRUE) or "off" (FALSE)). Typically a check box will contain a check mark if the configuration item being represented is "on". If a checkbox does not contain a check mark, the configuration item being represented is "off". FIG. 1 illustrates a GUI-based configuration menu containing check boxes and radio buttons.

GUI-based environments differ from a character-based (hereinafter "CB") environment or console. First, CB environments do not contain non character drawn graphics. That is, CB environments are usually comprised of textual characters (e.g., ASCII characters) only. There are no check boxes and radio buttons that can be manipulated to change settings. It is common for the number "1" to represent "yes" and the number "2" to represent "no". For example, a user may be presented with an option to enable "automatic disk de-fragmentation". A CB menu may state that typing "1" and the ENTER key means "yes" or typing "2" and the ENTER key means "no".

FIG. 2 illustrates a CB configuration menu. In FIG. 2, horizontal characters "-" are used to create separators between menu items. In this example, a separator exists between menu items 1 and 6, 9 and 11, 15 and 16, etc. It is also possible to indent certain menu items to depict a hierarchical structure amongst menu items. FIG. 2 displays such a hierarchy to show that sub-menu items may exist under a root menu item. For example, menu item 9 appears to be indented in order to show that it is a sub-menu item of item 8. Further, sub-menu items 19-24 are also indented to show that these items may only apply to menu item 18.

Existing CB environments (e.g., the prior art) only offer static or scripted menus. A complex array of character-based menus is hard-coded into the software of the application it represents. If changes to the menus are required, the software application's code must be edited and recompiled. In large production systems, editing and recompiling software applications can be time-consuming and expensive. In result, such changes to CB menus can be delayed or left unimplemented.

No other limitation of the prior art is that existing CB menus are specifically designed to work with a specific application. In other words, a CB menu created for application X, would not work within application Y, because it is dependent on application X through its hard coded static menus.

SUMMARY

A method for dynamically generating a console menu is described in which the method displays a console menu to a user that provides one or more menu options. Each of said one or more menu options are coupled to one or more console listeners. The method waits for said user to choose a selection from said menu options. Once a selection is made, the method allows said one or more console listeners coupled to said chosen selection to receive said selection. Lastly, the method dynamically generates a new console menu for said user based on said selection chosen by said user, wherein said new console menu provides one or more options which may be selected by said user.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for generating complex character-based computing interfaces.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An improvement over the prior art's use of static or scripted CB menus would allow for the dynamic creation and/or editing of a console menu. Another improvement would allow for CB menus to be application independent, yet be capable of interacting with or be manipulated by external applications.

Figure 1:
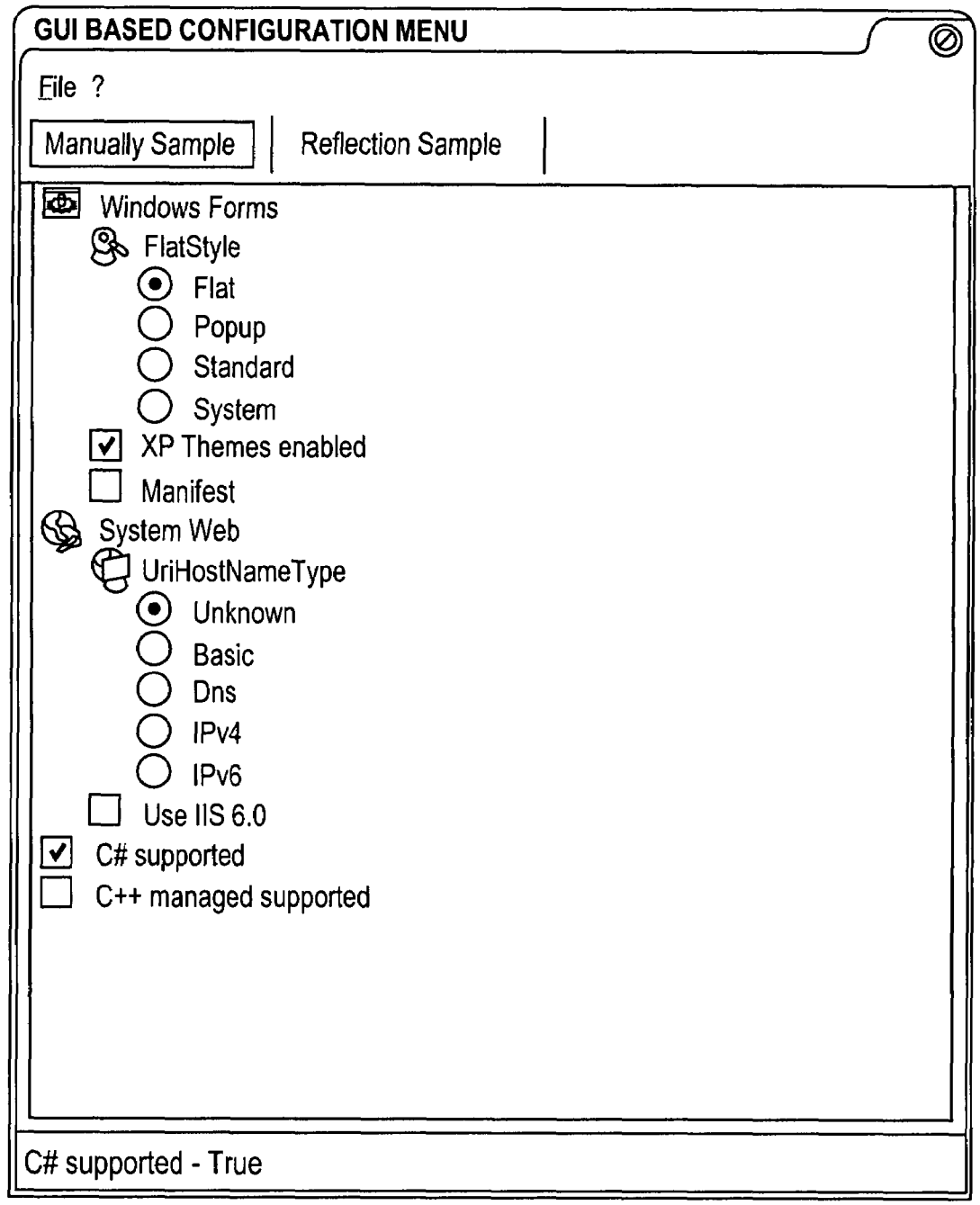
FIG. 1 illustrates a GUI-based configuration menu containing check boxes and radio buttons.
Figure 2:
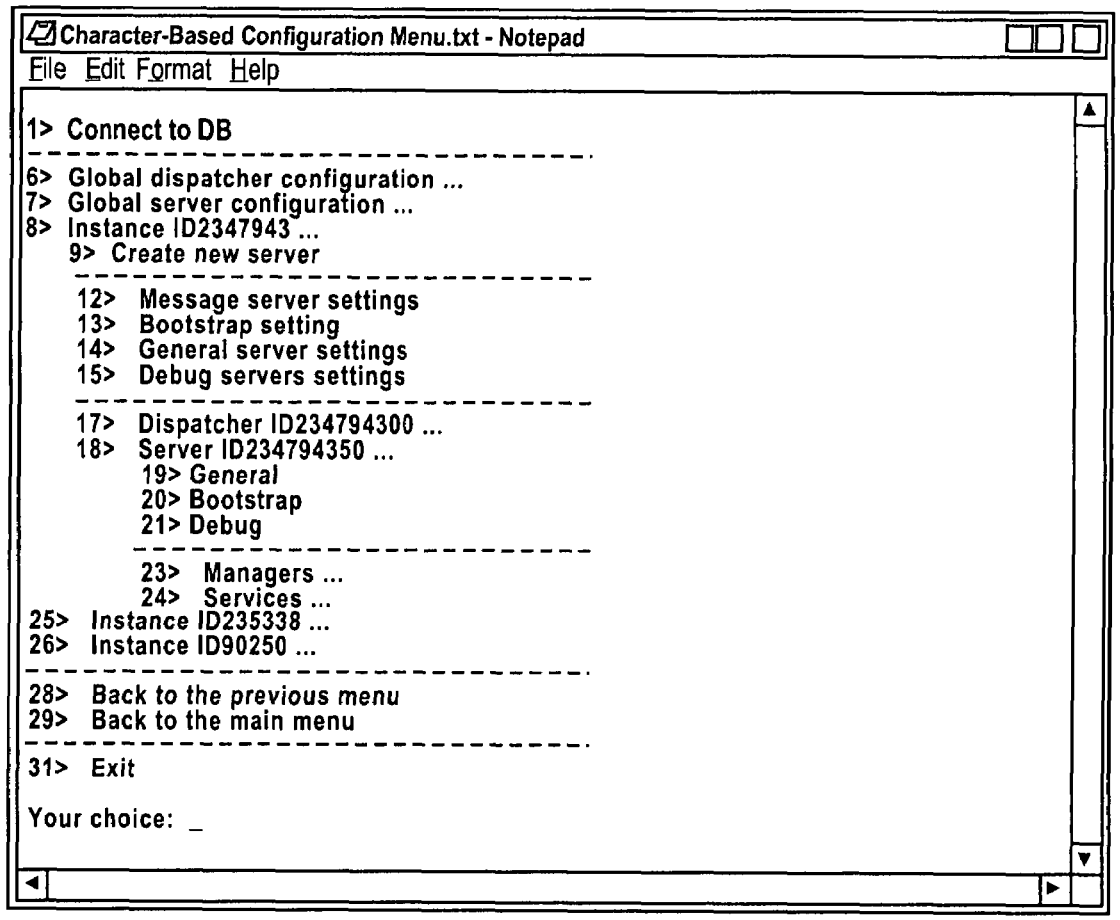
FIG. 2 illustrates a character-based configuration menu.
Figure 3:
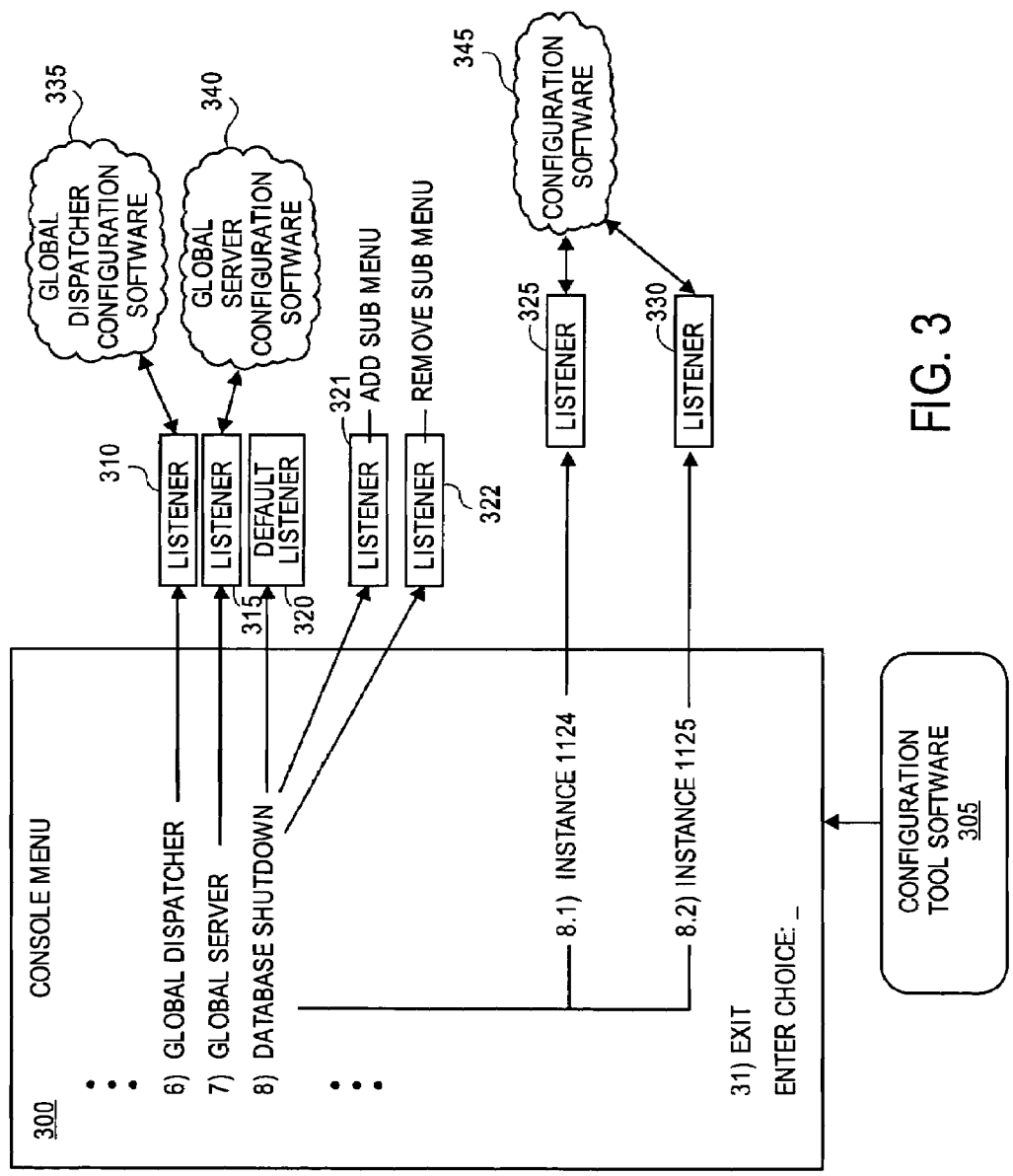
FIG. 3 illustrates a dynamically created, character-based menu that is capable of interacting with and being manipulated by external software application and developers.

FIG. 3 illustrates a CB configuration menu architecture that is capable of dynamic changes and interaction with and manipulation by multiple applications. User input of certain menu items will open/close sub menus, add/remove menu 300 items, and send requests to independent software modules. FIG. 3 displays a console menu 300 and a portion of its menu items. In console menu 300, there are visible menu items 6, 7, 8 and 31. Menu item 8 also contains sub-menu items 8.1 and 8.2, which are currently displayed. Note that submenu items are indented in order to clarify that they are submenu (e.g., children) items from root menu (e.g., parent) item 8.

Each menu item is coupled to a listener (e.g., menu item 6 is coupled to listener 310). A listener is a process that continuously runs, waiting to receive user input. Different types of listeners are capable of performing different functions. In one embodiment, there are two types of listeners: a listener and a default listener. (A "listener" and "default listener" are different types of listeners. When referring to a non-default listener the term "listener" will be used. When to referring to a default listener, the term "default listener" will be used. Default listeners perform the "solo" function of opening and closing submenus (e.g., item 8 contains submenus 8.1 and 8.2). Therefore, only root menu items with submenus (e.g., item 8) would have a default listener. If a menu item did not have a submenu beneath it, then no default listener would exist for that menu item. Further, in an embodiment, a menu item containing a submenu only has a single default listener. In FIG. 3, menu item 8 has a default listener 320. If a user selected 8 and hit ENTER, default listener 320 would close the submenu of item 8 (e.g., item 8.1 and 8.2). If the user were to repeat ENTER at item 8 again, default listener 320 would reopen the submenu of menu item 8. In this example, default listener 320 performs no other function.

Non-default listeners ("listeners") differ from default listeners because they perform functions other than opening and closing a menu item. In one embodiment it is possible for a single menu item (e.g., item 8) to have multiple listeners that perform additional functions. Here, the different listeners may be invoked with different character entries (e.g., "A" for listener 321 and "R" for listener 322). One such function is to dynamically add or remove submenu items. For example, menu item 8 could have a second listener (321) that functions to remove submenu items. Menu item 8 may also posses another listener (322) that allows for the adding of submenu items. One of the main and most important functions of listeners is to start external software applications or modules, and to pass parameters to them. This is the feature that allows the console menu to interact with external applications, yet still maintain independence from them.

Each branch of console menu 300 has an end point that signifies that no more menu items exist beyond this point. For example, menu item 8 does not have an end point since submenu items 8.1 and 8.2 exist further down. Yet both submenu items 8.1 and 8.2 have end points because they are the deepest part of the tree hierarchy. Typically, the listeners at each end point function start a software module and/or pass parameters to them.

In FIG. 3, menu item 6 has a listener 310. The function of listener 310 is to start "Global Dispatcher Configuration Software" 335. If a user were to select menu item 6 and hit ENTER, listener 310 would start external software module 335. Menu item 7 also has a listener 315. The function of listener 315 is to start "Global Server Configuration Software" 340. If a user were to select menu item 7 and hit ENTER, listener 315 would start external software module 340. Other examples include submenu items 8.1 and 8.2 that have listeners 325 and 330, respectively. Each of these relate to functions to be performed with configuration software 345.

As described above, the listeners of menu items 6, 7, 8.1 and 8.2 show how a console menu can run independent of any specific software application or module. Even though console menu 300 is able to launch configuration software modules 335 and 340, they may each run independently of one another. Also, the software modules (e.g., software modules 335 and 340) may have the ability to manipulate console menu 300 and its menu items. Such control is possible through the existence of Configuration Tool Software (hereinafter "CTS") 305. CTS 305 acts as an intermediary between console menu 300 and the software modules 335, 340, 345 that allows the modules that are controlled through console 300 to manipulate console menu 300 (e.g., with "returned" information).

In one embodiment, software module 335 has a plurality of menu items in console menu 300. Each of these items, and their corresponding listeners, are capable of passing requests to software module 335. Depending on the access level of the user, software module 335 may want to prevent certain menu items from being visible to the user. For example, software module 335 may communicate with CTS 305, asking that menu items 12-14 (not shown) be made invisible to the current user. In this case, software module 335 would pass the entire menu structure to CTS 305, who would then redraw console menu 300 to not display menu items 12-14. In such an example, the menu items would be displayed as: 10, 11, 15, 16. . . . In one embodiment, the menu structure is passed to CTS 305 as a text file.

In another embodiment, the listeners themselves are capable of manipulation of console menu 300 and its items. Such functionality exists to permit developers of the console menu to dynamically manipulate console menu 300 without having to edit software code and recompile the application and/or menu. For example, a developer may want to hide or display certain menus items, as done by software application 335 above. Perhaps a developer wants to hide menu items 12-14 as well. The developer could go through a listener who could pass the new menu structure directly to console menu 300.

Lastly, a developer may wish to add menu separators to console menu 300, through the help of a listener. Menu separators don't possess any functionality. They only act as visual aids in separating groups of menu items. A menu separator is a unique kind of submenu item that does not have any kind of a listener.

In another embodiment, software 335 may require its own CB configuration tool to compliment its existing GUI-based tool. Perhaps its limited interaction with console menu 300 is not enough. Software module 335 could take the entire menu structure of console menu 300 and adapt it for its specific needs (e.g., recreating the same functionality as the existing GUI-based configuration tool). All menu items could be changed to specifically apply to configuration options within software application 335.

Figure 4:
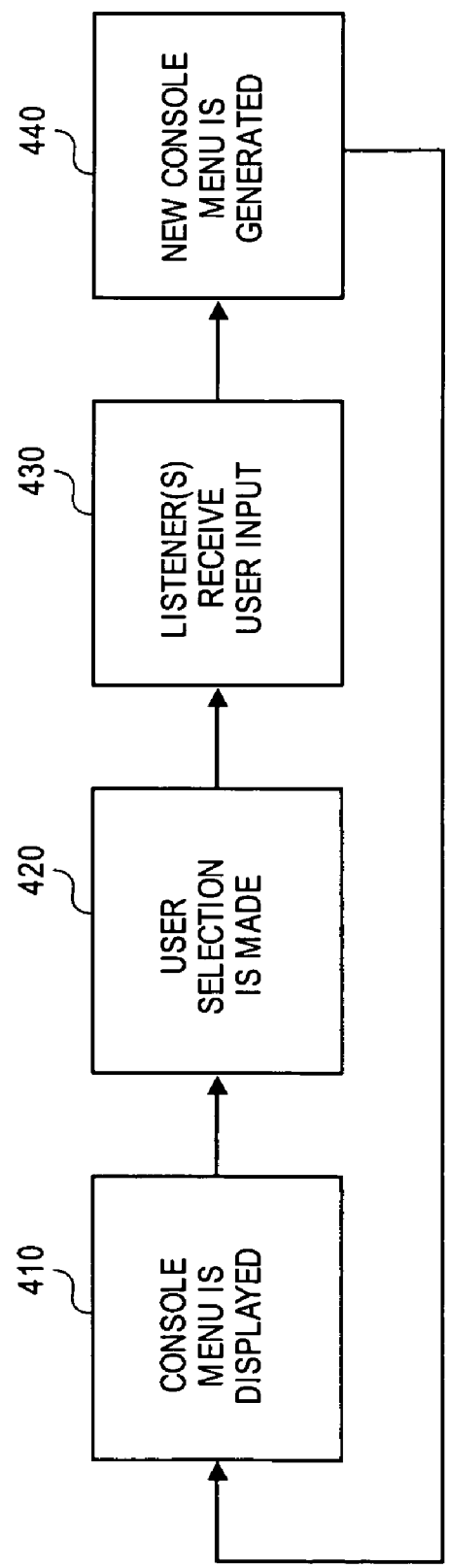
FIG. 4 illustrates a flow-chart process by which menu are dynamically generated in response to user input.

Another import aspect of creating dynamic menus is the way in which user responses are transmitted and received by listeners and software modules. First off, there is a loop that exists for the receiving of user input, generation of the console menu and display of the console menu. FIG. 4 illustrates this process in the form of flow chart 400. At the beginning of the looping process, the console menu is displayed 410. All menu items that are visible appear before a user. Next, the user makes a selection 420. The selection may be, for example, the entering of a number. In another embodiment, user selections may be the entering of alphanumeric characters instead of only numbers. As soon as the ENTER key is pressed, the response is deleted by a listener resulting in the calling of a software module. Next, any changes to be made to the console menu (e.g., as requested by the called upon software module) are generated as a text file or collection of strings 440. The new console menu structure is pushed to the console menu where it is redrawn and displayed for user 410, causing the loop to begin again.

Figure 5:
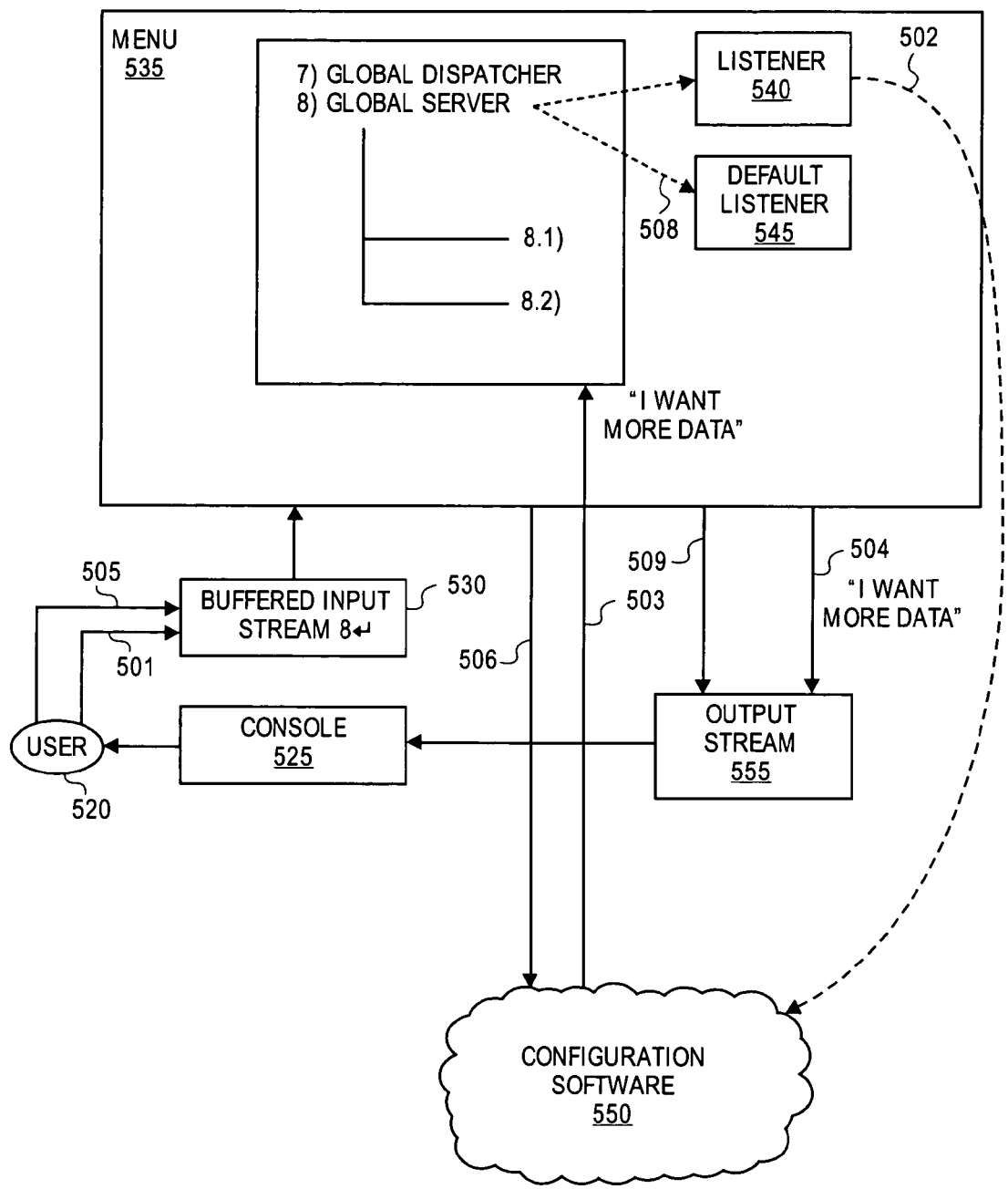
FIG. 5 illustrates an embodiment of how different inputs are sent and received by different modules in a computing system, which has implemented dynamically generated text-based configuration menus.

FIG. 5 illustrates an embodiment of how different inputs are sent and received by different modules in a computing system, which has implemented dynamically generated text-based configuration menus. User 520 is presented with menu 535 which is seen through console 525. User 520 types "8" which is passed 501 into Buffered Input Stream (hereinafter "BIS") 530. "8" sits in BIS 530 until user 520 hits "ENTER". Once user 520 hits "ENTER", the values are removed from buffer 530 and received by Listener 540. Listener 540 passes the values 502 to Configuration Software (hereinafter "CS") 550. Once the values have been received, CS 550 determines it wants more data from user 520. CS 550 passes information 503 to menu 535 requesting that menu 535 be edited to include a question that asks user 520 for more data. Menu 535 passes the new menu 504 (with the question to user 520) into output stream 555, which feeds directly into console 525. When the stream is received, console 525 builds the new menu with the data it received. The new menu is seen by user 520.

In response to the question posed to user 520, an answer to the question is passed 505 into BIS 530. Again, as soon as user 520 hits "ENTER", the value is removed from BIS 530 and received by menu 535. Next, menu 535 passes the values (e.g., the answer to CS 550's question) 506 to CS 550. CS 550 receives the input and performs some process based on the input. In one embodiment, CS 550 passes some parameters to another (not shown) software module. Once the process performed by CS 550 has ended, CS 550 rests. In the meantime Default Listener 545 received 508 the same input passed by user 520. Default listener 545 now passes 509 a new menu into output stream 555. The new menu adds additional information that may be seen by user 520. This information expands menu item 8 to include submenus 8.1 and 8.2. Output stream 555 then passes the new menu to console 520, where the menu us redrawn and visible by user 520.

Processes taught by the discussion above may be performed with program code such as machine-executable instructions, which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 6:
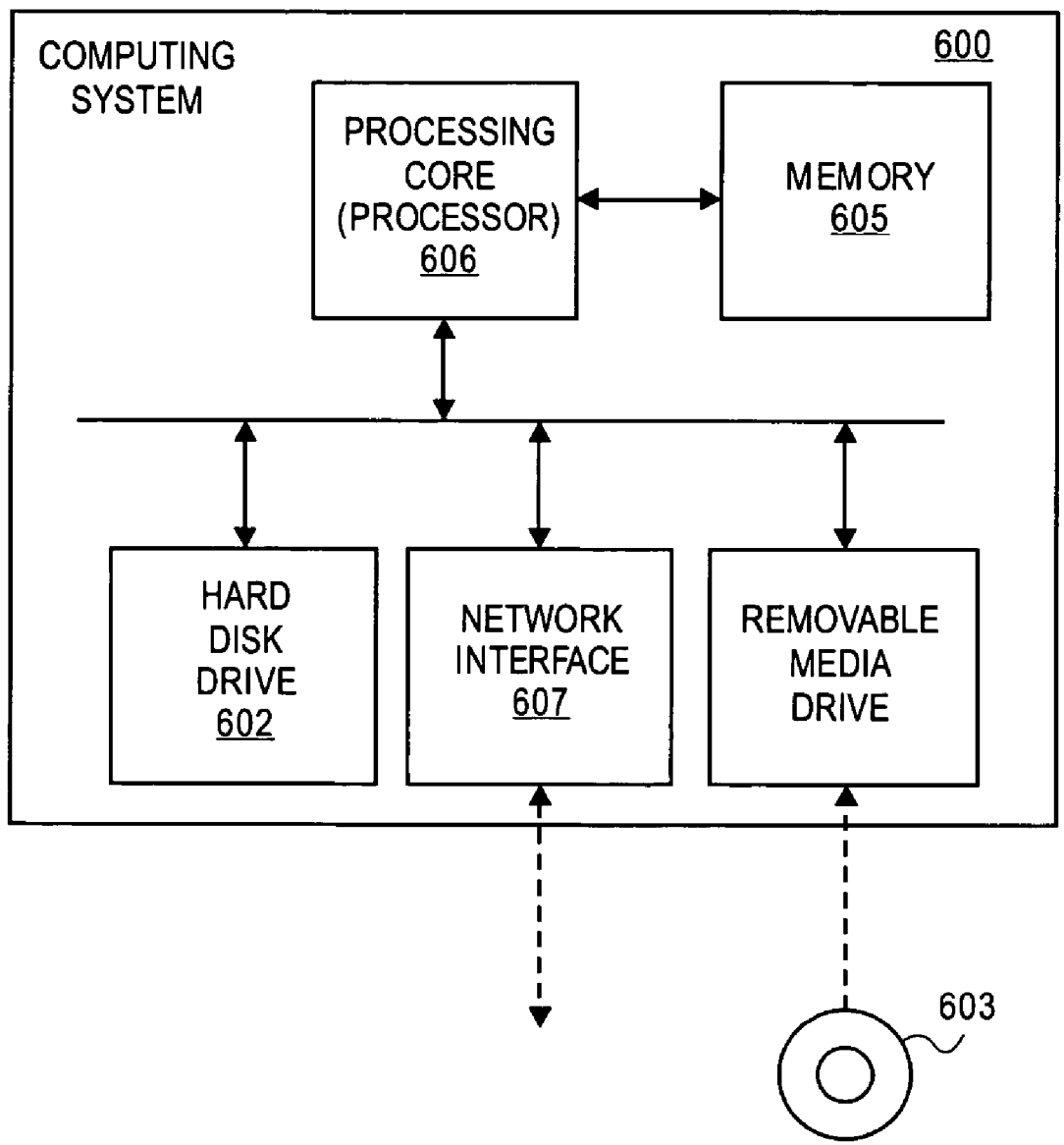
FIG. 6 illustrates a block diagram of a computing system that can execute program code stored by an article of manufacture.

FIG. 6 illustrates a block diagram of a computing system 600 that can execute program code stored by an article of manufacture. It is important to recognize that the computing system block diagram of FIG. 6 is just one of various computing system architectures. The applicable article of manufacture may include one or more fixed components (such as a hard disk drive 602 or memory 605) and/or various movable components such as a CD ROM 603, a compact disc, a magnetic tape, etc. In order to execute the program code, typically instructions of the program code are loaded into the Random Access Memory (RAM) 605; and, the processing core 606 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 606.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for dynamically generating a console menu comprising:

reading program code and processing said program code with a processing core to perform the following method:

displaying a console menu to a user that provides one or more menu options, wherein each of said one or more menu options is coupled to one or more respective console listeners such that there is at least one listener object instance per menu option and each of said one or more menu options that include an ability to generate a sub menu have their own instance of a default listener object that triggers display of a new menu, each default listener instance being different than each listener object instance;

waiting for said user to choose a selection from said menu options;

once a selection of a particular menu option is made, notifying at least one of its associated one or more console listeners, said at least one console listener being configuration software for at least one of:

a dispatcher a server; and, dynamically generating a new console menu for said user based on said selection chosen by said user, wherein said new console menu provides a new set of one or more user selectable options, said dynamically generating including said configuration software determining that menu options are to be hidden from said user, and, in response thereto said configuration software providing a structure that describes said new console menu.

2. The method of claim 1 wherein said console menu is a character-based menu.

3. The method of claim 1 wherein a listener that receives said notifying interacts with one or more external software modules in response.

4. The method of claim 3, wherein said one or more external software modules are independent of said console menu.

5. The method of claim 3, wherein said one ore more external software modules are able to pass information to said console menu in order to alter contents of said console menu.

6. The method of claim 5, wherein said one or more external software modules are able to present questions to said user by way of passing information to said console menu.

7. The method of claim 5, wherein said information from said one or more external software modules, is placed in an output stream in order to reach said console menu.

8. The method of claim 1, wherein said selection made by said user is placed in a buffered input stream in order to reach said at least one associated one or more console listeners.

9. The method of claim 1, wherein at least some of said menu options are sub-menu options.

10. The method of claim 9, wherein there exists a root menu option that at least one of said sub-menu options falls under, said root menu coupled to a default console listener, which is responsible for displaying and hiding said at least one of said sub-menus.

11. An article of manufacture, comprising:
   program code stored on a storage medium which, when executed by one or more processors, causes the machine to preform the following method for dynamically generating a console menu in an object oriented enviornment:
   displaying a console menu to a user that provides one or menu options,
   wherein each of said one or more menu options is coupled to one or more respective console listeners such that there is at least one listener object instance per menu option and each of said one or more menu options that include an ability to generate a sub menu have there own instance of a default listener object that triggers display of a new menu, each default listener instance being different than each listener object instance;
   waiting for said user to choose a selection from said menu options;
   once a selection of a particular menu option is made, notifying at least one of its associated one or more console listeners, said at least one console listener being configuration software for at least one of:
      a dispatcher;
      a server; and,
   dynamically generating a new console menu for said user based on said selection chosen by said user, wherein said new console menu provides a new set of one or more user selectable options, said dynamically generating including said configuration software determining that menu options are to be hidden from said user, and, in response thereto said configuration software providing a structure that describes said new console menu.

12. The article of manufacture of claim 11 wherein said console menu is a character-based menu.

13. The article of manufacture of claim 11 wherein a listener that receives said notifying interacts with one or more external software modules in response.

14. The article of manufacture of claim 13, wherein said one or more external software modules are independent of said console menu.

15. The article of manufacture of claim 13, wherein said one or more external software modules are able to pass information to said console menu in order to alter contents of said console menu.

16. The article of manufacture of claim 15, wherein said one or more external software modules are able to present questions to said user by way of passing information to said console menu.

17. The article of manufacture of claim 15, wherein said information from said one or more external software modules, is placed in an output stream in order to reach said console menu.

18. The article of manufacture of claim 11, wherein said selection made by said user is placed in a buffered input stream in order to reach said at least one associated one or more console listeners.

19. A computing system comprising:
   a virtual machine, a plurality of processors and program code disposed on a computer readable medium, said program code capable of being interpreted by said virtual machine to perform a method for dynamically generating a console menu, said method comprising:
   in an object oriented environment,
   displaying a console menu to a user that provides one or more menu options,
   wherein each of said one or more menu options is coupled to one or more respective console listeners such that there is at least one listener object instance per menu option and each of said one or more menu options that include an ability to generate a sub menu have their own instance of a default listener object that triggers display of a new menu, each default listener instance being different than each listener object instance;
   waiting for said user to choose a selection from said menu options;
   once a selection of a particular menu option is made, notifying at least one of its associated one or more console listeners, said at least one console listener being configuration software for at least one of:
      a dispatcher;
      a server; and,
   dynamically generating a new console menu for said user based on said selection chosen by said user, wherein said new console menu provides a new set of one or more user selectable options, said dynamically generating including said configuration software determining that menu options are to be hidden from said user, and, in response thereto said configuration software providing a structure that describes said new console menu.

20. The computing system of claim 19 wherein said console menu is a character-based menu.

* * * * *